(12) United States Patent
Vanhees et al.

(10) Patent No.: US 7,743,896 B2
(45) Date of Patent: Jun. 29, 2010

(54) SHOCK ABSORBER HAVING A CONTINUOUSLY VARIABLE SEMI-ACTIVE VALVE

(75) Inventors: Gert Vanhees, Kortessem (BE); Koen Reybrouck, Brussels (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 931 days.

(21) Appl. No.: 11/546,501

(22) Filed: Oct. 11, 2006

(65) Prior Publication Data

US 2008/0087512 A1 Apr. 17, 2008

(51) Int. Cl.
  *F16F 9/34* (2006.01)
(52) U.S. Cl. ............................. 188/322.13; 188/299.1; 188/266.6; 188/322.2
(58) Field of Classification Search ............ 188/322.13, 188/299.1, 322.2, 266.6, 266.1, 266.2, 282.2, 188/282.3, 282.4, 285–287, 313, 315, 317, 188/318, 322.22
See application file for complete search history.

(56) References Cited

U.S. PATENT DOCUMENTS

| | | | |
|---|---|---|---|
| 3,125,186 A | 3/1964 | Day | |
| 5,934,421 A | 8/1999 | Nakadate et al. | |
| 5,960,915 A * | 10/1999 | Nezu et al. | 188/266.6 |
| 6,119,829 A | 9/2000 | Nakadate | |
| 6,155,391 A | 12/2000 | Kashiwagi et al. | |
| 6,182,805 B1 | 2/2001 | Kashiwagi et al. | |
| 6,321,888 B1 * | 11/2001 | Reybrouck et al. | 188/322.2 |
| 2005/0077378 A1 | 4/2005 | Kropp et al. | |

OTHER PUBLICATIONS

International Search Report and Written Opinion dated Apr. 25, 2008 in corresponding PCT Application No. PCT/US07/21641.

* cited by examiner

*Primary Examiner*—Pam Rodriguez
(74) *Attorney, Agent, or Firm*—Harness, Dickey & Pierce, PLC

(57) ABSTRACT

A shock absorber includes an external valve which controls the damping characteristics of the shock absorber. The external valve controls the flow of fluid between the lower working chamber of the shock absorber and the reservoir chamber and between the upper working chamber of the shock absorber. The damping characteristics are dependent on the amount of current being applied to a solenoid valve which controls the movement of a plunger.

21 Claims, 4 Drawing Sheets

SHOCK ABSORBER HAVING A CONTINUOUSLY VARIABLE SEMI-ACTIVE VALVE

FIELD

The present disclosure relates to a hydraulic damper or shock absorber adapted for use in a suspension system such as the suspension systems used for automotive vehicles. More particularly, the present disclosure relates to a hydraulic damper or shock absorber having an externally mounted electromagnetic control valve which generates different pressure-flow characteristics as a function of the current supplied to the electromagnetic control valve.

BACKGROUND

The statements in this section merely provide background information related to the present disclosure and may not constitute prior art.

A conventional hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle. A first valving system is optionally incorporated within the piston as a safety hydraulic relief valve which functions during the shock absorber's extension stroke of the piston with respect to the cylinder and a second valving system is incorporated within the piston for allowing fluid replenishment above the piston during the shock absorber's compression stroke of the piston with respect to the cylinder.

Various types of adjustment mechanisms have been developed to generate damping forces in relation to the speed and/or amplitude of the displacement of the sprung or unsprung mass. Often, the damping characteristics are controlled by an externally mounted control valve. An externally mounted control valve is advantageous in that it may be easily removed for service or replacement.

SUMMARY

A shock absorber according to the present disclosure includes a pressure tube defining a working chamber. A piston is slidably disposed on the pressure tube within the working chamber and the piston divides the working chamber into an upper working chamber and a lower working chamber. A reserve tube surrounds the pressure tube to define a reserve chamber. An intermediate tube is disposed between the reserve tube and the pressure tube to define an intermediate chamber. An external control valve is secured to the reserve tube and the intermediate tube. An inlet to the control valve is in communication with the intermediate chamber and an outlet of the control valve is in communication with the reserve chamber. The control valve generates different pressure flow characteristics for the damper or shock absorber which controls the damping characteristics for the damper or shock absorber. The different pressure-flow characteristics are a function of the current supplied to the control valve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
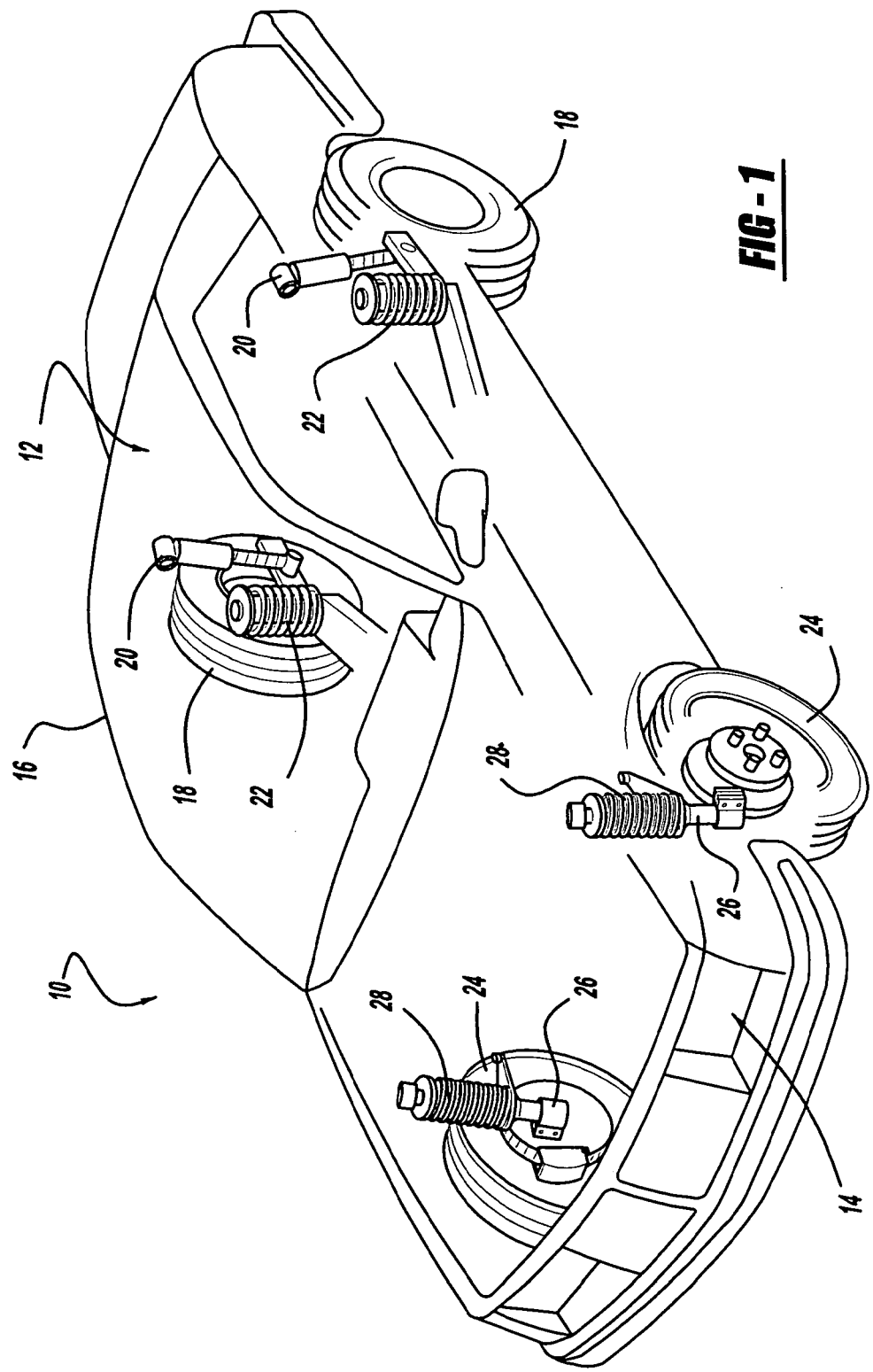
FIG. 1 illustrates an automotive vehicle which incorporates shock absorbers in accordance with the present disclosure.

The following description is merely exemplary in nature and is not intended to limit the present disclosure, application, or uses. Referring now to the drawings in which like reference numerals designate like components throughout the several views, there is shown in FIG. 1 a vehicle incorporating a suspension system having shock absorbers in accordance with the present disclosure, and which is designated by the reference numeral 10.

Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
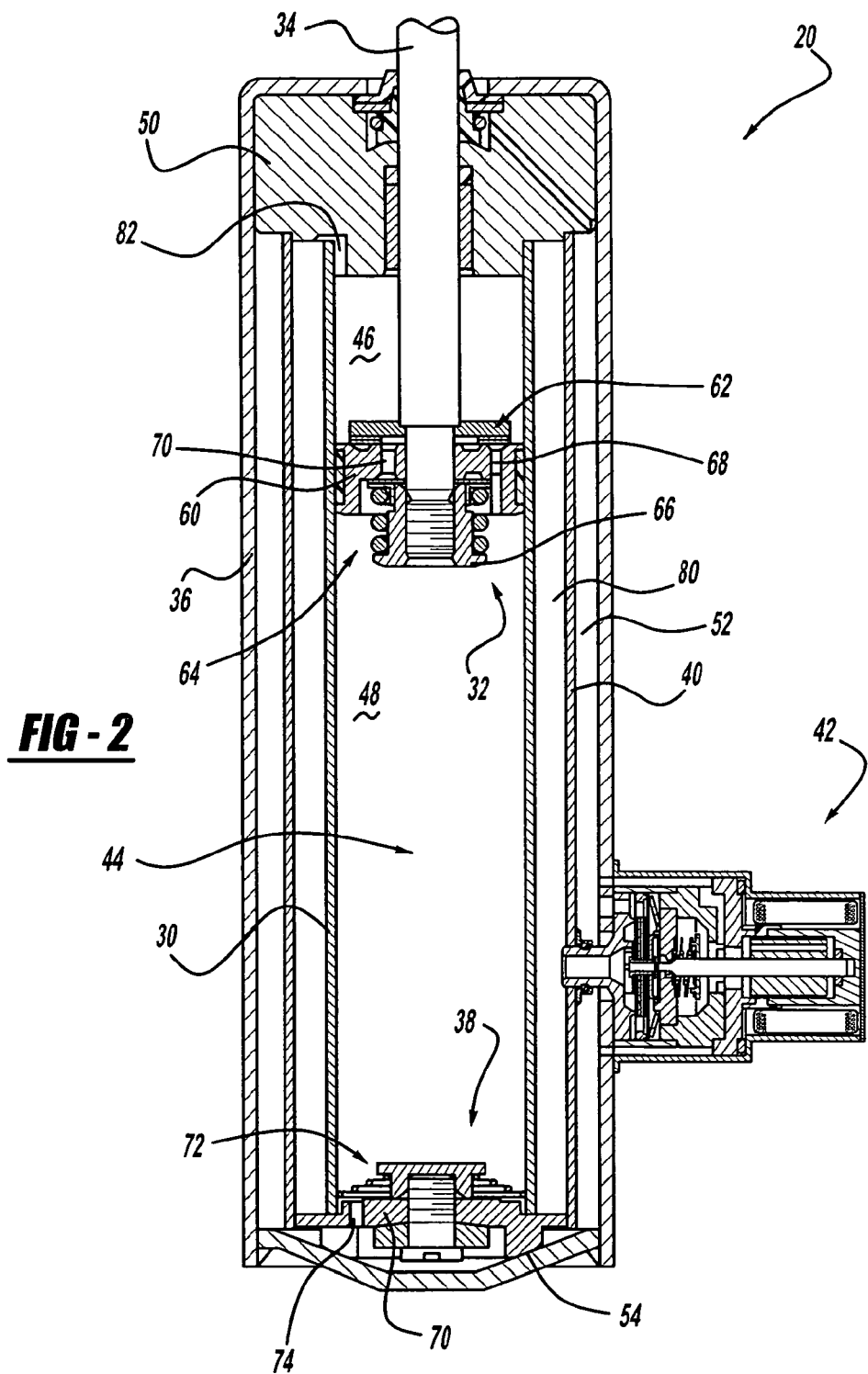
FIG. 2 is a cross-sectional side view of one of the shock absorbers illustrated in FIG. 1.

Referring now to FIG. 2, shock absorber 20 is shown in greater detail. While FIG. 2 illustrates only shock absorber 20, it is to be understood that shock absorber 26 also includes the valve design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36, a base valve assembly 38, an intermediate tube 40 and an externally mounted control valve 42.

Pressure tube 30 defines a working chamber 44. Piston assembly 32 is slidably disposed within pressure tube 30 and divides working chamber 44 into an upper working chamber 46 and a lower working chamber 48. A seal is disposed between piston assembly 32 and pressure tube 30 to permit sliding movement of piston assembly 32 with respect to pressure tube 30 without generating undue frictional forces as well as sealing upper working chamber 46 from lower working chamber 48. Piston rod 34 is attached to piston assembly 32 and extends through upper working chamber 46 and through an upper rod guide assembly 50 which closes the upper end of pressure tube 30. A sealing system seals the interface between upper rod guide assembly 50, reserve tube 36 and piston rod 34. The end of piston rod 34 opposite to piston assembly 32 is adapted to be secured to the sprung mass of vehicle 10. Because piston rod 34 extends only through upper working chamber 46 and not lower working chamber 48, extension and compression movements of piston assembly 32 with respect to pressure tube 30 causes a difference in the amount of fluid displaced in upper working chamber 46 and the amount of fluid displaced in lower working chamber 48. The difference in the amount of fluid displaced is known as the "rod volume" and during extension movements it flows through base valve assembly 38. During a compression movement of piston assembly 32 with respect to pressure tube 30, valving within piston assembly 32 allow fluid flow from lower working chamber 48 to upper working chamber 46 and the "rod volume" of fluid flow flows through control valve 42 as described below.

Reserve tube 36 surrounds pressure tube 30 to define a fluid reservoir chamber 52 located between tubes 30 and 36. The bottom end of reserve tube 36 is closed by a base cup 54 which is adapted to be connected to the unsprung mass of vehicle 10. The upper end of reserve tube 36 is attached to upper rod guide assembly 50. Base valve assembly 38 is disposed between lower working chamber 46 and reservoir chamber 52 to control the flow of fluid from reserve chamber 52 to lower working chamber 48. When shock absorber 20 extends in length, an additional volume of fluid is needed in lower working chamber 46 due to the "rod volume" concept. Thus, fluid will flow from reservoir chamber 52 to lower working chamber 48 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through control valve 42 as detailed below.

Piston assembly 32 comprises a piston body 60, a compression valve assembly 62 and an extension valve assembly 64. A nut 66 is assembled to piston rod 34 to secure compression valve assembly 62, piston body 60 and extension valve assembly 64 to piston rod 34. Piston body 60 defines a plurality of compression passages 68 and a plurality of extension passages 70.

During a compression stroke, fluid in lower working chamber 48 is pressurized causing fluid pressure to react against compression valve assembly 62. Compression valve assembly 62 acts as a check valve between lower working chamber 48 and upper working chamber 46. The damping characteristics for shock absorber 20 during a compression stroke are controlled by control valve 42. Control valve 42 controls the flow of fluid from lower working chamber 48 to reserve chamber 52 due to the "rod volume" concept during a compression stroke as discussed below. During an extension stroke, compression passages 68 are closed by compression valve assembly 62.

During an extension stroke, fluid in upper working chamber 46 is pressurized causing fluid pressure to react against extension valve assembly 64. Extension valve assembly 64 is designed as a safety hydraulic relief valve which will open when the fluid pressure within upper working chamber 46 exceeds a predetermined limit. The damping characteristics for shock absorber 20 during an extension stroke are controlled by control valve 42 as discussed below. Control valve 42 controls the flow of fluid from upper working chamber 46 to reserve chamber 52. Replacement flow of fluid into lower working chamber 48 during an extension stroke flows through base valve assembly 38.

Base valve assembly 38 comprises a valve body 70 and an extension valve assembly 72. Valve body 70 defines a plurality of extension passages 74. During an extension stroke, fluid in lower working chamber 48 is reduced in pressure causing fluid pressure in reserve chamber 52 to open extension valve assembly 72 and allow fluid flow from reserve chamber 52 to lower working chamber 48. Extension valve assembly 72 acts as a check valve between reserve chamber 52 and lower working chamber 48. The damping characteristics for shock absorber 20 during an extension stroke are controlled by control valve 42 as described below.

Intermediate tube 40 engages upper rod guide assembly 50 on an upper end and it engages base valve assembly 38 on a lower end. An intermediate chamber 80 is defined between intermediate tube 40 and pressure tube 30. A passage 82 is formed in upper end cap 50 for fluidly connecting upper working chamber 46 and intermediate chamber 80.

During a rebound or extension stroke, compression valve assembly 62 closes the plurality of compression passages 68 and fluid pressure within upper working chamber 46 increases. Fluid is forced from upper working chamber 46 through passage 82 into intermediate chamber 80 and into control valve 42. Extension valve assembly 64 is designed as a safety valve and it will only open when the fluid pressure within upper working chamber 46 exceeds a predetermined maximum pressure. Extension valve assembly 72 of base valve assembly 38 will open to allow fluid flow from reserve chamber 52 to lower working chamber 48.

During a compression stroke, compression valve 62 will open to allow fluid flow from lower working chamber 48 to upper working chamber 46. Due to the "rod volume" concept, fluid in upper working chamber will be pushed from upper working chamber 48, through passage 82 into intermediate chamber 80 and into control valve 42. Extension valve assembly 72 of base valve assembly 38 will close extension passages 74 prohibiting fluid flow through base valve assembly 38 during a compression stroke.

Figure 3:
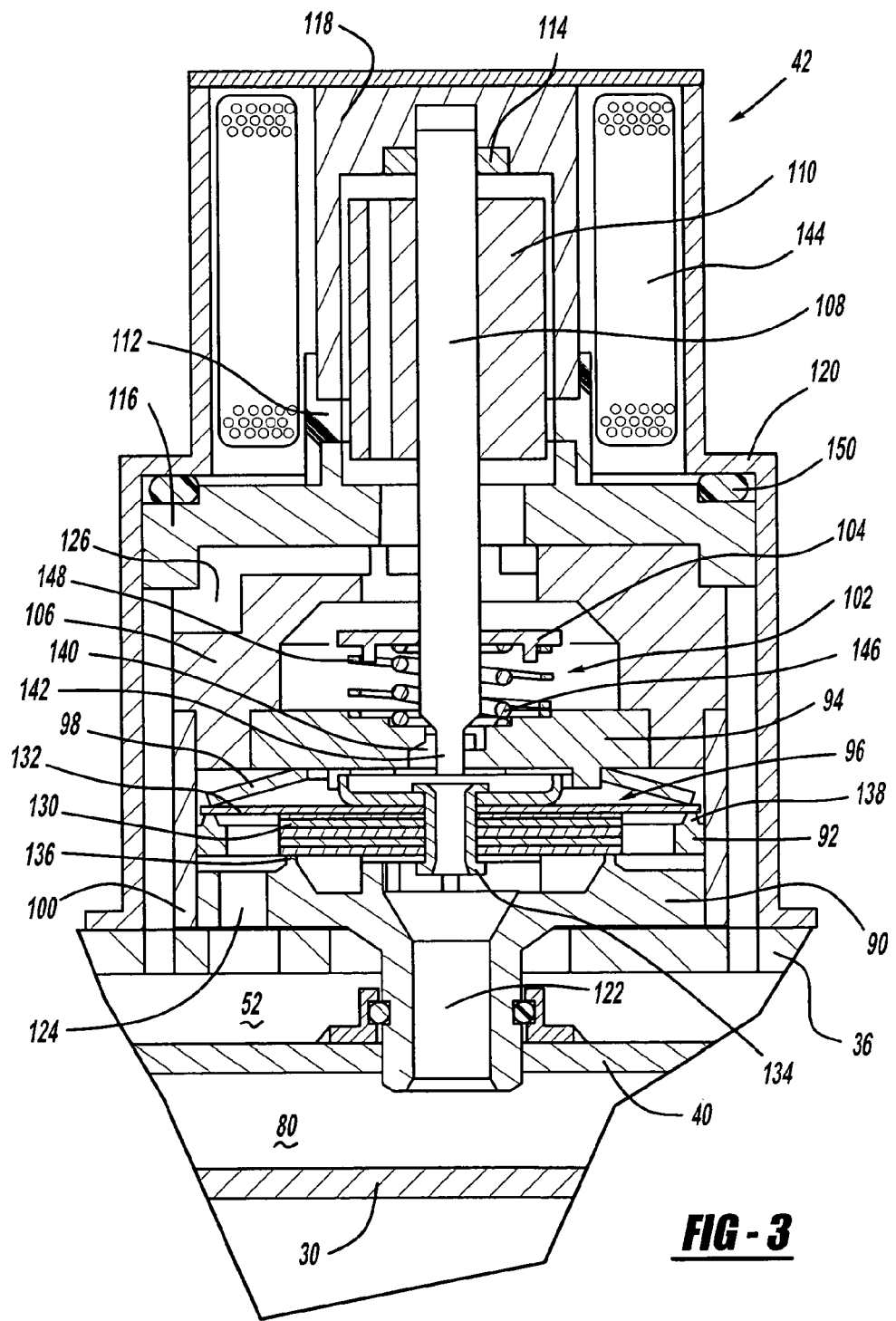
FIG. 3 is an enlarged cross-sectional side view of the externally mounted control valve illustrated in FIG. 2.

Referring to FIG. 3, control valve 42 is illustrated. Control valve 42 comprises a lower stack valve seat 90, an upper stack support ring 92, a pilot valve plate 94, a double disc stack 96, a disc spring 98, an outer tube 100, a pilot spring set 102, a pilot spring seat 104, a valve body 106, a pilot plunger 108, an anker 110, a non-magnetic ring 112, a pilot plunger bearing 114, a valve top plate 116, an anker housing 118 and a mounting housing 120.

Control valve 42 is mounted to shock absorber 20 such that an inlet 122 in lower stack valve seat 90 is in communication with intermediate chamber 80, an outlet 124 in lower stack valve seat 90 is in communication with reservoir chamber 52 and an outlet 126 in valve body 106 is in communication with reservoir chamber 52.

Double disc stack 96 comprises a lower valve stack 130, an upper valve stack 132 and a valve pin 134. Valve pin 134 assembles lower valve stack 130 and upper valve stack 132. Double disc stack 96 is positioned within control valve 42 such that lower valve stack 130 engages a sealing land 136 located on lower stack valve seat 90, upper valve stack 132 engages a sealing land 138 located on upper stack support ring 92 and disc spring 98 engages pilot valve plate 94 which guides the movement of double disc stack 96. Outer tube 100 positions upper stack support ring 92 and lower stack valve plate 90 in relation to valve body 106 into which pilot valve plate 94 is secured. Disc spring 98 is disposed between pilot valve plate 94 and double disc stack 96 to urge upper valve stack 132 into engagement with sealing land 138 and lower valve stack 130 into engagement with sealing land 136.

Pilot valve plate 94 defines a calibrated hole 140 within which a valve needle 142 defined by pilot plunger 108 is disposed. The position of pilot plunger 108 and thus valve needle 142 in relation to calibrated hole 140 is controlled by the amount of electrical current supplied to a coil 144 and pilot spring set 102. Pilot spring set 102 comprises a functional spring 146 and a failsafe spring 148. Pilot spring set 102 is disposed between pilot valve plate 94 and pilot spring seat 104 which is attached to pilot plunger 108. Pilot spring set 102 urges pilot plunger 108 away from pilot valve plate 94. Functional spring 146 operates in normal conditions when there is a magnetic force created by coil 144 and failsafe spring 148 operates during a loss of magnetic force to urge pilot plunger 108 completely to its end stop. When pilot plunger 108 is at its end stop, the pilot flow is restricted due to a restriction being created between pilot spring seat 104 and valve body 106 leading to outlet 126.

Valve top plate 116 engages valve body 106 and mounting housing 120. A seal 150 seals the interior of control valve 42. Non-magnetic ring 112 mounts anker housing 118 to valve top plate 116. Anker housing 118 surrounds anker 110. Anker 110 is press fitted onto pilot plunger 108. The assembly of pilot plunger 108 and anker 110 moves axially guided by pilot plunger bearing 114 and pilot valve plate 94.

When fluid is provided to inlet 122 from intermediate chamber 80 in either a compression stroke or an extension stroke, the fluid flows via a second path through valve pin 134, through calibrated hole 140, through outlet 126 to reservoir chamber 52. Valve needle 142 of pilot plunger 108 is disposed within calibrated hole 140 to act as a resistance to fluid flow. Thus, fluid pressure will increase above double disc stack 96 urging upper valve stack 132 into engagement with sealing land 138 and lower valve stack 130 into engagement with sealing land 136. When pilot plunger 108 is retracted, lower current, a larger flow of fluid through calibrated hole 140 is permitted which results in a lower pressure above double disc stack 96. The entire double disc stack 96 will lift upwards resulting in a relatively low or soft damping as lower valve stack 130 will easily separate from sealing land 136 at the relatively low pressure providing fluid flow via its first or main path. When pilot plunger 108 is extended, higher current, a smaller flow of fluid through calibrated hole 140 is permitted which results in a higher pressure above double disc stack 96. A relatively high or firm damping will occur as lower valve stack 130 will remain seated on sealing land 136 until a higher pressure (blow-off pressure) is generated at inlet 122. The amount of fluid amount of fluid flow can be adjusted anywhere between a maximum and a minimum by positioning pilot plunger 108 at a position between its end positions.

Figure 4:
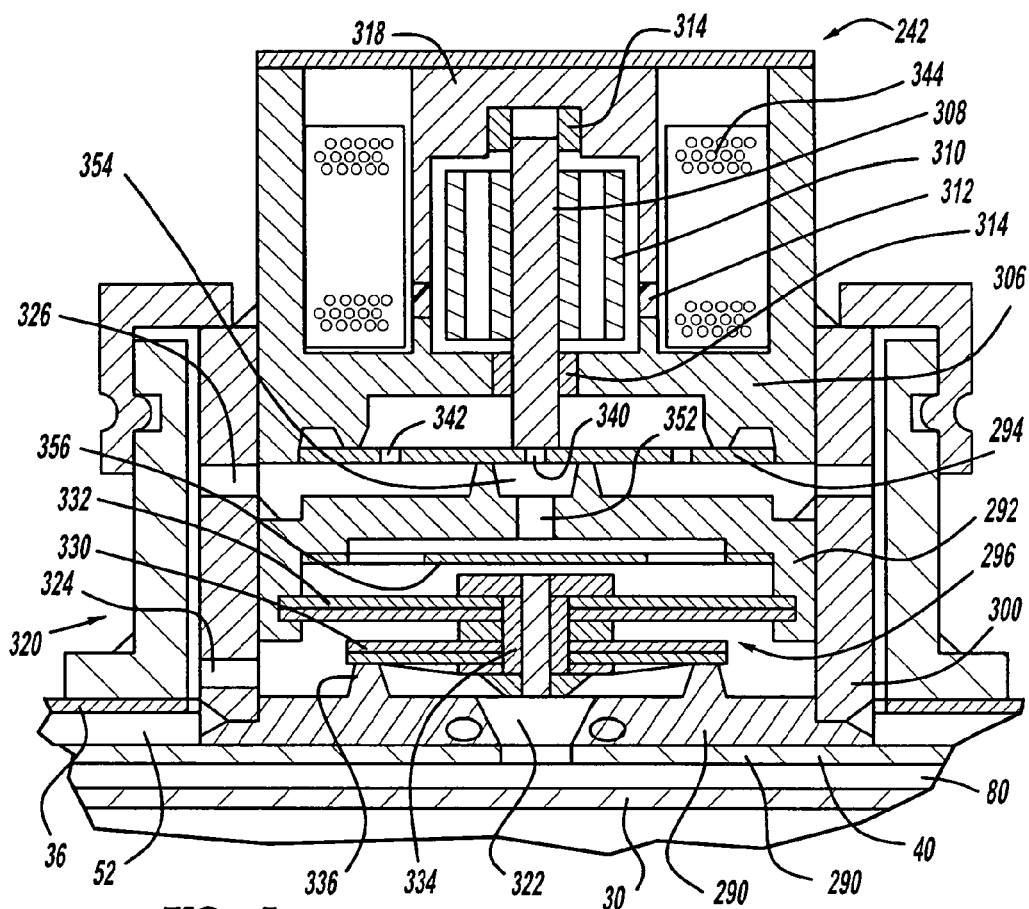
FIG. 4 is an enlarged cross-sectional side view of an externally mounted control valve in accordance with another embodiment of the disclosure.
Figure 5:
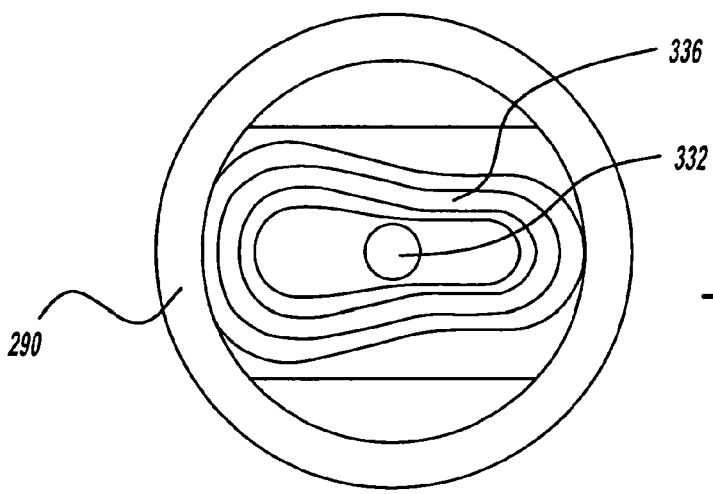
FIG. 5 is a plan view of the lower valve seat illustrated in FIG. 4.

Referring now to FIGS. 4 and 5, a control valve 242 in accordance with another embodiment of the present disclosure is illustrated. Control valve 242 comprises a lower stack valve seat 290, an upper stack support ring 292, a pilot disc 294, a double disc stack 296, an outer tube 300, a valve body 306, a pilot plunger 308, an anker 310, a non-metallic ring 312, a pair of pilot plunger bearings 314, an anker housing 318 and a mounting housing 320.

Control valve 242 is mounted to shock absorber 20 such that an inlet 322 in lower stack valve seat 290 is in communication with intermediate chamber 80, an outlet 324 in outer tube 300 is in communication with reservoir chamber 52 and an outlet 326 in outer tube 300 is in communication with reservoir chamber 52.

Double disc stack 296 comprises a lower valve stack 330, an upper valve stack 332 and a valve pin 334. Valve pin 334 assembles lower valve stack 330 and upper valve stack 332. Double disc stack 296 is positioned within control valve 242 such that lower valve stack 330 engages a sealing land 336 located on lower stack valve seat 290 and upper valve stack 332 engages upper stack support ring 292. Outer tube 300 positions upper stack support ring 292 and lower stack valve plate 290 in relation to valve body 306. Pilot disc 294 is disposed between upper stack support ring 292 and valve body 306. Pilot disc 294 defines an inlet hole 340 and one or more outlet holes 342. Pilot plunger 308 engages pilot disc 294 to close inlet hole 340. The load applied to pilot disc 294 from pilot plunger 308 will be determined by the amount of current being supplied to a coil 344.

Coil 344 is disposed within valve body 306 and non-metallic ring 312 mounts anker housing 318 to valve body 306. Mounting housing 320 mounts control valve 242 to shock absorber 20. Pilot plunger 308 moves axially within anker housing 318 and is guided for this axial motion by pilot plunger bearings 314, which are mounted in anker housing 318 and valve body 306.

When fluid is provided to inlet 322 from intermediate chamber 80 in either a compression stroke or an extension stroke, the fluid flows through valve pin 334, through an aperture 352 formed in upper stack support ring 292, and into a chamber 354 which is in communication with inlet hole 340 of pilot disc 294. A disc 356 redirects the fluid flow between inlet 322 and aperture 352 to obtain turbulent flow and as such limit direct flow forces due to a laminar oil jet.

As illustrated in FIGS. 4 and 5, sealing land 336 is not flat but it is a curved shape such that a defined leak flow path is created. The leak flow path is present from zero pressure through pressure build up. In addition, sealing land 336 is not circular but it has a shape such that the blow-off area for lower valve stack 332 is asymmetrical which provides a smoother opening for lower valve stack 332.

As the fluid pressure increases in chamber 354, pilot plunger 308 will eventually be pushed away from pilot disc 294 to allow fluid flow through inlet hole 340, through outlet hole 342, through outlet 326 and into reserve chamber 52. When a low current is supplied to coil 344, pilot plunger 308 will apply a light load to pilot disc 294 which results in pilot plunger 308 being separated from pilot disc 294 at a relatively low pressure. This will create a low pressure above double disc stack 396. This will provide a relatively low or soft damping as lower valve stack 330 will separate from sealing land 336 at a relatively low pressure. When a high current is supplied to coil 344, pilot plunger 308 will apply a heavy load to pilot disc 294 which results in pilot plunger 308 being separated from pilot disc 294 at a relatively high pressure. This will create a high pressure above double disc stack 396. This will provide a relatively high or firm damping as lower valve stack 330 will separate from sealing land 336 at a relatively high pressure. The amount of fluid flow can be adjusted anywhere between a maximum and an minimum by positioning pilot plunger 308 at a position between its end positions.

What is claimed is:
1. A shock absorber comprising:
a pressure tube forming a working chamber;

a piston assembly slidably disposed within said pressure tube, said piston assembly dividing said working chamber into an upper working chamber and a lower working chamber;

a reserve tube disposed around said pressure tube;

an intermediate tube disposed between said pressure tube and said reserve tube, an intermediate chamber being defined between said intermediate tube and said pressure tube, a reservoir chamber being defined between said intermediate tube and said reserve tube; and a valve assembly mounted to said reserve tube, said valve assembly having an inlet in communication with said intermediate chamber and an outlet in communication with said reservoir chamber, said valve assembly comprising:

a lower disc closing a first passage extending between said inlet and said outlet;

a second passage extending between said inlet and said outlet, said second passage extending through said lower disc to a chamber defined above said lower disc;

a first valve disposed within said second passage between said chamber and said outlet; and a second valve disposed within said second passage between said first valve and said outlet.

2. The shock absorber according to claim 1, further comprising means for varying a load which urges said first valve into a closed position.

3. The shock absorber according to claim 2, wherein said varying means comprises a coil having a plunger.

4. The shock absorber according to claim 1, further comprising means for varying an opening degree of said first valve.

5. The shock absorber according to claim 4, wherein said varying means comprises a calibrated hole and a needle valve.

6. The shock absorber according to claim 5, wherein said varying means further comprises a coil and a plunger, said needle valve being attached to said plunger.

7. The shock absorber according to claim 4, wherein said varying means comprises a coil having a plunger, said plunger defining a hole forming a portion of said second passage.

8. The shock absorber according to claim 1, further comprising an upper disc forming said chamber, said upper disc being attached to said lower disc.

9. The shock absorber according to claim 8, further comprising means for varying a load which urges said first valve into a closed position.

10. The shock absorber according to claim 9, wherein said varying means comprises a coil having a plunger.

11. The shock absorber according to claim 8, further comprising means for varying an opening degree of said first valve.

12. The shock absorber according to claim 11, wherein said varying means comprises a calibrated hole and a needle valve.

13. The shock absorber according to claim 12, wherein said varying means further comprises a coil and a plunger, said needle valve being attached to said plunger.

14. The shock absorber according to claim 11, wherein said varying means comprises a coil having a plunger, said plunger defining a hole forming a portion of said second passage.

15. The shock absorber according to claim 8, further comprising a valve pin securing said upper disc to said lower disc, said valve pin defining a hole extending through said upper and lower discs between said inlet and said chamber.

16. The shock absorber according to claim 15, further comprising means for varying a load which urges said first valve into a closed position.

17. The shock absorber according to claim 16, wherein said varying means comprises a coil having a plunger.

18. The shock absorber according to claim 15, further comprising means for varying an opening degree of said first valve.

19. The shock absorber according to claim 18, wherein said varying means comprises a calibrated hole and a needle valve.

20. The shock absorber according to claim 19, wherein said varying means further comprises a coil and a plunger, said needle valve being attached to said plunger.

21. The shock absorber according to claim 15, wherein said varying means comprises a coil having a plunger, said plunger defining a hole forming a portion of said second passage.

* * * * *